United States Patent [19]
Oda

[11] Patent Number: 5,646,984
[45] Date of Patent: Jul. 8, 1997

[54] PAYER-VARIABLE EXCHANGE SYSTEM

[75] Inventor: Toshikane Oda, Fujimi, Japan

[73] Assignee: Kokusai Denshin Denwa Co., Ltd., Tokyo, Japan

[21] Appl. No.: 411,873

[22] Filed: Mar. 28, 1995

[30] Foreign Application Priority Data

Mar. 28, 1994 [JP] Japan ................... 6-056878

[51] Int. Cl.$^6$ .................................. H04M 15/00
[52] U.S. Cl. ..................... 379/114; 379/115; 379/121
[58] Field of Search ................... 379/111–115, 120, 379/121, 127, 130, 201, 133, 134, 140

[56] References Cited

U.S. PATENT DOCUMENTS

| | | | |
|---|---|---|---|
| 4,788,719 | 11/1988 | Gupta | 379/130 |
| 5,146,491 | 9/1992 | Silver | 379/114 |
| 5,303,297 | 4/1994 | Hillis | 379/111 |
| 5,341,414 | 8/1994 | Popke | 379/201 |
| 5,381,467 | 1/1995 | Rosinski | 379/113 |
| 5,430,794 | 7/1995 | Ayame | 379/112 |
| 5,448,633 | 9/1995 | Jamalenddin | 379/201 |

*Primary Examiner*—Curtis Kuntz
*Assistant Examiner*—Vijay Shankar

[57] ABSTRACT

In a payer-variable exchange system, exchanges 2A and 2B and payer change control devices are provided corresponding to telephones 1A and 1B used by communicators A and B, payer change function units 4A and 4B of the payer change control devices 3A and 3B transmit and receive signals with the payer change function units 4A and 4B of the other parties, a communication amount for which the communicator itself is the payer is calculated by the charge calculation units 5A and 5B, and the same operation is repeated every time a payer change request is received.

11 Claims, 4 Drawing Sheets

When there is no payer change request to change the payer for the previous communication time segment When there is payer change request to change the payer for the previous communication time segment

FIG. 4A

Communication charge table X

| Communication time section number | Communication time section length (unit: e. g. sec) | Charging rule identifier |
|---|---|---|
| 1 | Tx(1)=180 | r-1 |
| 2 | Tx(2)=0 | |
| 3 | Tx(3)=511 | r-1 |
| 4 | Tx(4)=0 | |
| 5 | Tx(5)=32 | r-2 |
| 6 | Tx(6)=0 | |
| ⋮ | ⋮ | |
| 18 | Tx(18)=11 | r-3 |
| 19 | Tx(19)=0 | |
| 20 | Tx(20)=0 | |

← Last communication time section (row 18)

FIG. 4B

Communication charge table Y

| Communication time section number | Communication time section length (unit: e. g. sec) | Charging rule identifier |
|---|---|---|
| 1 | Ty(1)=0 | |
| 2 | Ty(2)=247 | r-5 |
| 3 | Ty(3)=0 | |
| 4 | Ty(4)=13 | r-7 |
| 5 | Ty(5)=0 | |
| 6 | Ty(6)=9 | r-7 |
| ⋮ | ⋮ | |
| 18 | Ty(18)=0 | |
| 19 | Ty(19)=0 | |
| 20 | Ty(20)=0 | |

← Last communication time section (row 18)

PAYER-VARIABLE EXCHANGE SYSTEM

FIELD OF THE INVENTION

This invention relates to a payer-variable exchange system, more specifically to an exchange system which connects two or more communicators to provide them with communication services in which a communicator can change the payer of the communication fee during the communication to charge the communication fee to a single or a plurality of communicators.

DESCRIPTION OF PRIOR ART

In a typical conventional telephone exchange system, a specific service number is dialed at the calling to decide the communication fee to be charged to one of the caller or receiver, and the payer of the communication fee should not be changed after the communication begins.

Further, in a telephone exchange system in which the communication fee is charged to the caller, there are systems which receive a transfer instruction of the communication fee from the receiver during communication so that the full amount or a specified fraction of the communication fee is automatically charged to the receiver.

However, to change from charging the caller to charging the receiver, even when the communication by charging the caller is to be continued with charging the receiver from a certain point of time during the communication, in such a conventional system as shown above, the line must be once disconnected to call again so that the communication fee is charged to one who was the receiver before the disconnection. This requires tedious redialing.

For such a requirement to change the payer during communication, a telephone exchange system has been proposed which automatically transfers a specified fraction of the communication fee charged to the caller to the receiver after the communication is complete in response to the instruction of the receiver. However, when the system is utilized, it is necessary that the device for processing charging to the caller recognizes the charging rule to the receiver. Since, in a exchange system connecting a plurality of communication networks of different suppliers such as in an international communication network and the like, the devices for controlling charging to the caller and receiver apply independent charging rules, it is necessary to provide a new mechanism for always holding charging rules of other networks.

Further, when the caller communicates by a pay telephone using coins or the like, it is impossible to automatically transfer a specified fraction of the communication fee charged to the caller to the receiver after the communication because the fee was already paid by the caller.

Further, to continue communication by charging to the caller in order to receive a special information service from the receiver side during communication by charging to the receiver, that is, utilizing a free telephone service or the like, in the prior art technology, the line must be once disconnected, and re-calling be made so that the fee for the following re-called communication is charged to one who was the receiver before the disconnection. This requires tedious re-calling.

Therefore, a primary object of the present invention is to provide a payer-variable exchange system which allows a change of payers during communication as described above without disconnecting the line and among a plurality of networks with different charging rules without exchanging information on the individual charging rules.

Another object of the present invention is to provide a payer-variable exchange system which, even in a single network, allows charge calculation according to correct charging rules to the payers without changing the charging rate according to a specific charging rule to the receiver during processing the charge to the caller.

A further object of the present invention is to provide a payer-variable exchange system which allows a change of payers even when communicating by a pay telephone using coins or the like without disconnecting the communication line.

SUMMARY OF THE INVENTION

In accordance with the present invention, which attains the above objects, there is provided a payer-variable exchange system wherein a caller and a receiver are connected by a communication line through an exchange according to a called number instructed by the caller from a communication terminal and the communication fee of the communication is charged to the caller or the receiver according to tariffs common or specific to each of the caller and the receiver, comprising payer change control means for receiving an instruction of a communicator to change a payer during communication so that a communication fee from a specified point of change during the communication to a next-specified point of change is charged to a communicator as a payer who was not a payer before the change according to a charging rule to the payer.

With the present invention, the payer change control means changes the payer in response to a payer change instruction. In this case, if the charging rule to the payer is changed, thereafter the new charging rule is effective.

The present invention will become more fully understood from the detailed description given hereinbelow and the accompanying drawings which are given by way of illustration only, and, thus are not limitative of the present invention, and wherein:

BRIEF DESCRIPTION OF THE DRAWINGS

FIG. 4A and FIG. 4B are diagrams showing communication amount tables.

The invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

DETAILED DESCRIPTION OF PREFERRED EMBODIMENTS

An embodiment of the present invention will be described in detail with reference to the drawings.

Figure 1A:
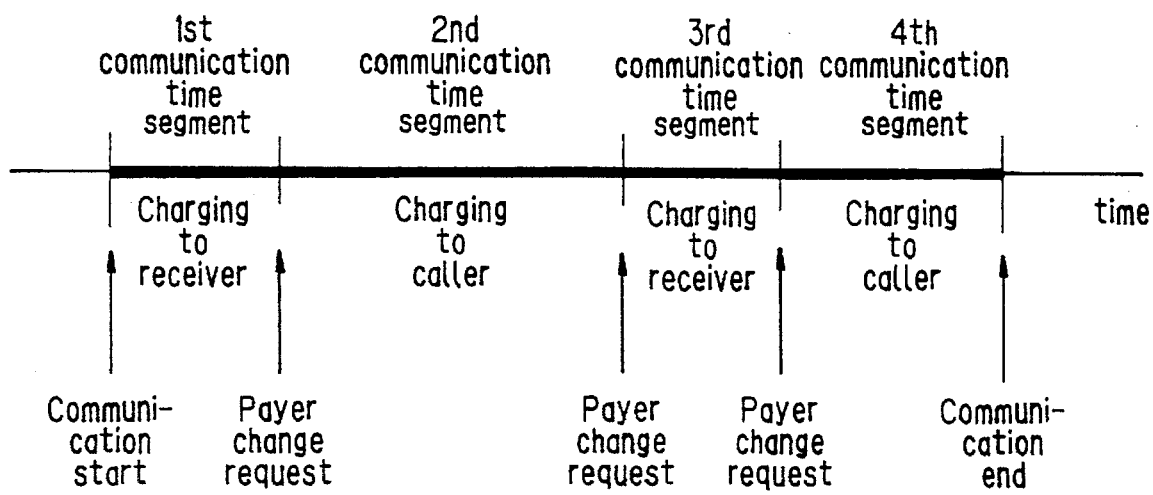
FIG. 1A and FIG. 1B are block diagrams schematically showing payer change to communication according to the present invention.
Figure 1B:
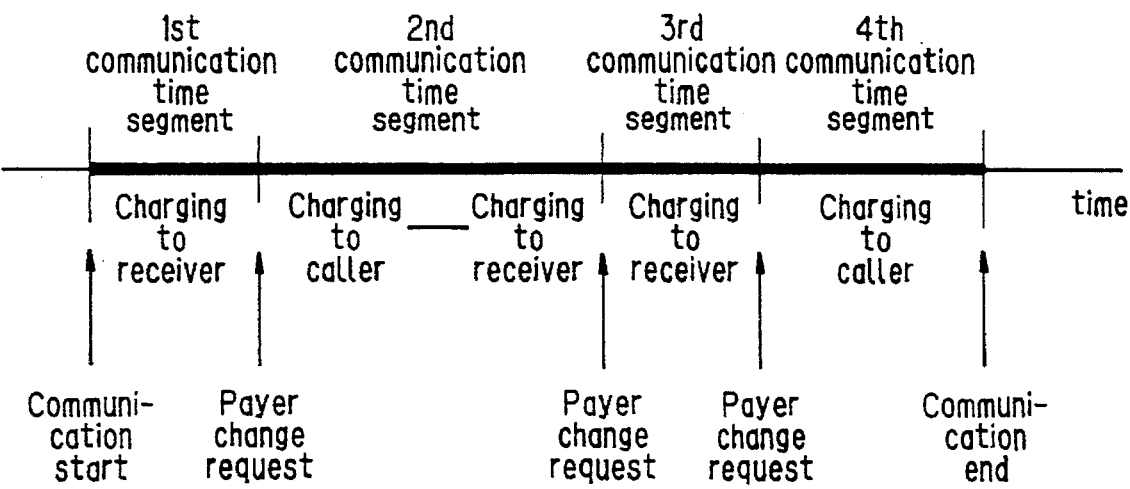

FIG. 1 is a block diagram showing the system construction of an embodiment of the present invention. In the present embodiment, the present invention is applied to a telephone exchange network or ISDN, and specifically has payer change control devices 3A and 3B comprising payer change function units 4A and 4B, charge calculation units 5A and 5B, and memories 6A and 6B.

Figure 3:
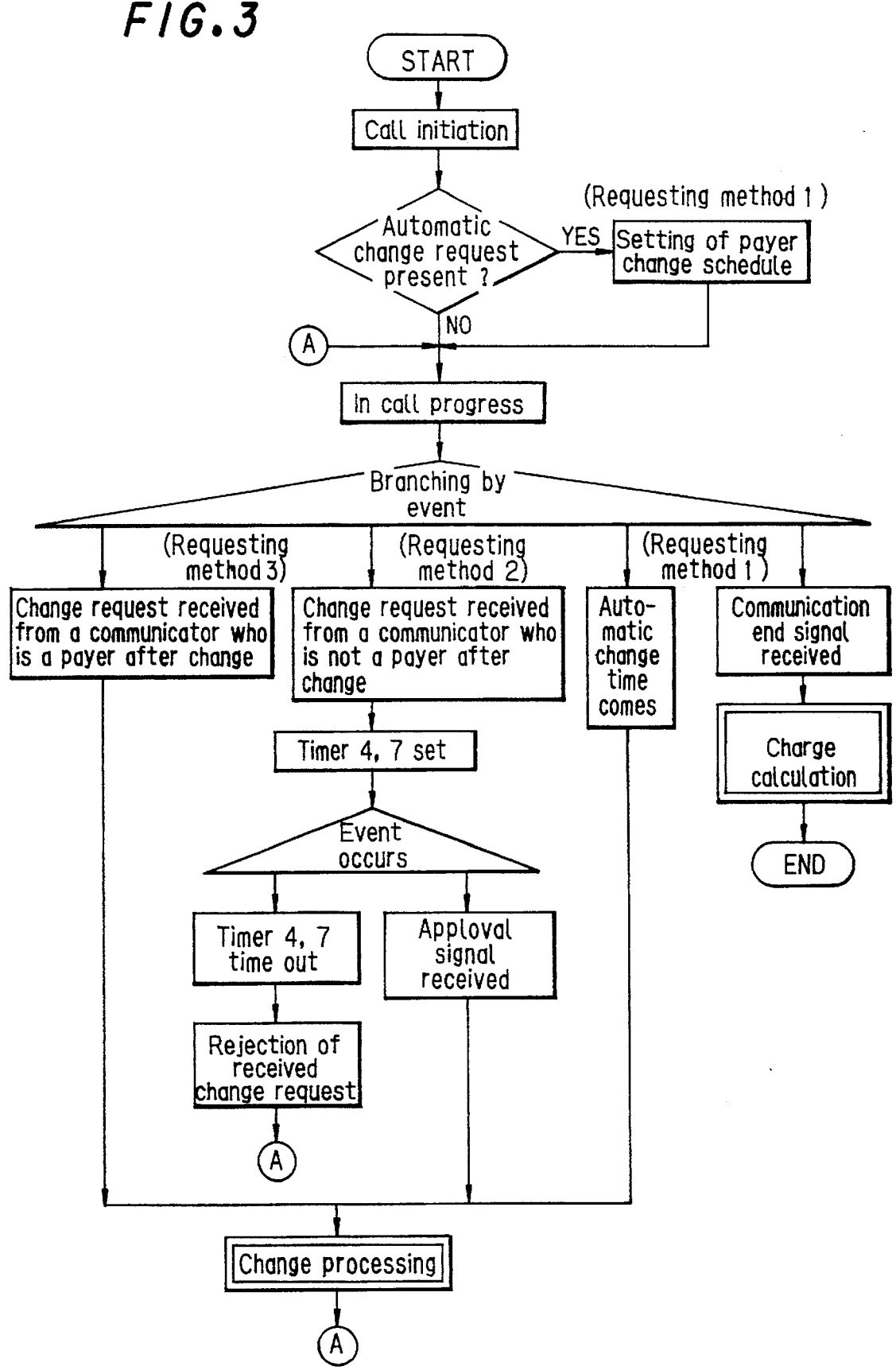
FIG. 3 is a flow chart showing the processing procedure of a payer change request signal.

FIG. 3 is a flow chart showing the processing procedure of a payer change request signal.

Configurations of issuing a payer change request include the following cases:

(Requesting method 1): A change request is automatically made according to an instruction (plan for the time of change, indication of payer, and the like) registered in a data base before calling.

(Requesting method 2): A change request is transmitted by a communicator who is not a payer after the change or a third party.

(Requesting method 3): A change request is transmitted by a communicator who becomes a payer after the change.

In the requesting method 1, it is assumed that the approval of the communication who becomes a payer after the change is obtained at the registration. In the requesting method 2, it is required to obtain an approval of the communicator who becomes a payer after the change.

Further, methods for totalizing communication fees to be charged individually to the caller and the receiver according to the request from the communicators include the following:

(Summation method 1): A method in which the exchanges for controlling charging to the payers individually totals the communication amounts or charge amounts.

(Summation method 2): A method in which an exchange for carrying out the communication amount summation is determined at call initiation time for performing centralized processing during communication, and necessary information such as chargeable communication amounts is transferred to the relevant exchanges to the individual communication amounts or charge amounts.

Figure 2:
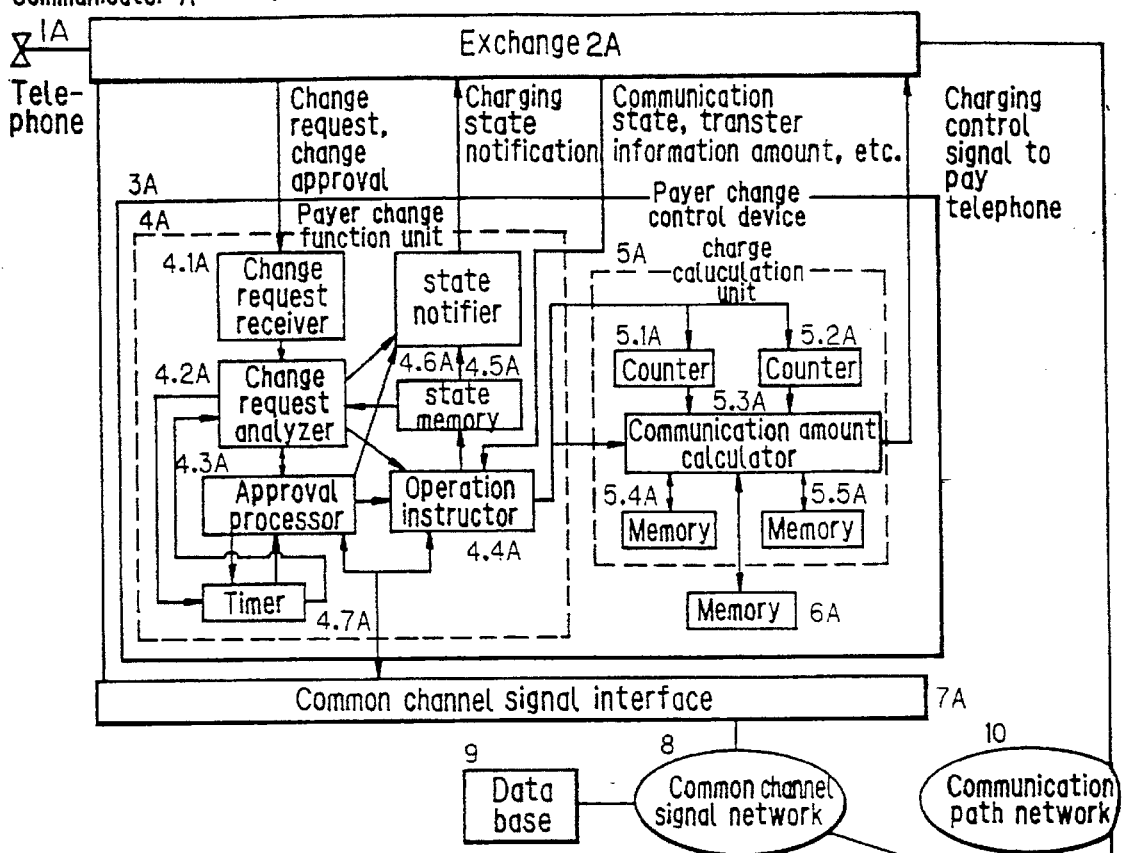
FIG. 2 is a block diagram showing an embodiment of the present invention.
Figure 2:
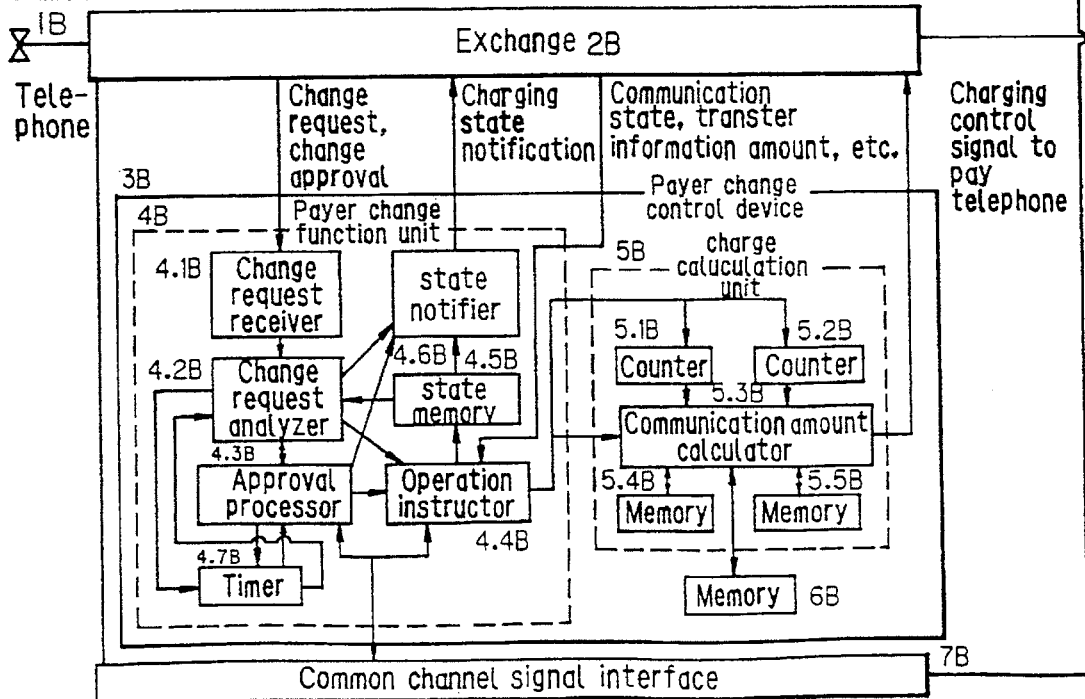

The payer-variable exchange system according to the present invention achieves the above requesting methods 1 to 3 and the summation methods 1 and 2 and, as shown in FIG. 2, both terminals have telephones 1A and 1B as communication terminals, exchanges 2A and 2B, payer change control devices 3A and 3B, and common channel signal interfaces 7A and 7B, wherein the payer change control devices 3A and 3B are connected by a common channel signal network 8 through the common channel signal interfaces 7A and 7B, and the exchanges 2A and 2B are connected to each other through a communication path network 10. The common channel signal network 8 is connected with a data base 9 which stores predetermined information for making, for example, the requesting method 1. Further, the communicator of the telephone 1A is referred to as a communicator A, and that of the telephone 1B is referred to as a communicator B.

The exchange 2A executes exchange processing as in the past when a call is made by the telephone 1A to the telephone 1B, searches the data base 9 through the common channel interface 7A and the common channel signal network 8 before the beginning of communication to check for registration of automatic payer change request related to the communicators A and B, if the automatic payer change request is registered (requesting method 1), transmits the contents the change (details the change such as time of change, new payer) to the payer change function unit 4A, or if not, without performing the above processing, transmits a signal indicating communication condition such as communication start to the payer change control device 3A to supply a trigger of charging processing by the payer change control device 3A.

The payer change control means 3A begins charging processing by a signal indicating communication condition supplied through the exchange 2A and predetermined payer change processing when a payer change request is made, and has the payer change function unit 4A, the charge calculation unit 5A, and the memory 6A.

Further, the payer change function unit 4A includes a request signal receiver 4.1A, a change request analyzer 4.2A, an approval processor 4.3A, an operation instructor 4.4A, a state memory 4.5A, and a state notifier 4.6A, whereby processing a signal indicating payer change request while transmitting and receiving information with the other payer change function unit 4B as necessary.

The charge calculation unit 5A includes a counter 5.1A, a communication amount calculator 5.3A, and a memory 5.4A, whereby under the control of the payer change function unit 4A, counts the communication amount of the telephone 1A to charge to the communicator A, and calculates the amount of charged communication units according to the count value and data stored in the memory 6A to prepare a communication charge table X (described later in detail) shown in FIG. 4(a). Further, the charge calculator unit 5A also includes a counter 5.2A and a memory 5.5A so that, not only the communicator A, but also the communication amount to be charged to the communicator B is counted to prepare a communication charge table Y (described later in detail) shown in FIG. 4(b). Further, when the telephone 1A is a pay telephone such as a public telephone, the communication amount calculator 5.3A transmits charge control pulses for charging to the telephone 1A through the exchange 2A.

The memory 6A stores information (contents of communication service contract, accumulation of charged communication amount, and the like) related to the communicator A and the attributes (location of receiver, communication distance, contents of communication service contract, and the like) of the communicator B, that is, data to be the basis for charging.

The charging rule such as communication time and rate per one unit of charged communication amount is determined according to the storage contents of the memory 6A. Therefore, the memory 6A is not necessarily required to be included in the payer change control device 3A. It may be contained in any unit of the system.

The above arrangement of the exchange 2A, the payer change control device 3A, the payer change function unit 4A, the charge calculation unit 5A, and the memory 6A is similar for the exchange 2B, the payer change control device 3B, the payer change function unit 4B, the charge calculation unit 5B, and the memory 6B corresponding to the telephone 1B of the communicator B.

Here the change control procedure will be described with reference to FIG. 2 for a case in which the communicators A and B communicate with the communicator A as the initial payer and the communication fees are totaled individually by the payer change control devices 3A and 3B (summation method 1).

In the following description, the communication amount for charging is the communication time, however, in the exchange system of the present invention, the communication amount for charging is not limited to the communication time as far as the amount is measurable.

(1) The communicator A calls up the communicator B. Before calling, it is assumed that the communication time counters 5.1A, 5.1B, 5.2A, and 5.2B in the charge calculation units 5A and 5B of the payer change control devices 3A and 3B and the communication amount tables X and Y in the memories 5.4A, 5.5A, 5.4B, and 5.5B are initialized.

Before starting communication, the exchange 2A or 2B checks the data base 9 of the communicators A and B through the common channel signal interface 7A, the common channel signal network 8, and the common channel signal interface 7B for registration of an automatic payer change request.

When an automatic payer change request is registered (for the case of requesting method 1), the change instruction (contents of change such as time of change, new payer, and the like) are received by the request signal receiver 4.1A, and analyzed by the change request analyzer 4.2A to set the timer 4.7A so that the change processing is automatically started at the time of change (e.g. 3 minutes after starting communication).

(2) The communication is started. At the same time, the operation instructor 4.4A starts the counter 5.1A in response to the communication state signal from the exchange 2A to start communication time measurement of the communication, and sets the state memory 4.9A indicating the present payer (in this case, the communicator A).

The operation instructor 4.4A further notifies the operation instructor 4.4B at the communicator B side that the communicator A is the present payer, through the common channel signal interface 7A, the common channel signal network, and the common channel signal interface 7B. On receiving this signal, the operation instructor 4.4B sets the communicator A to the state memory 4.5B.

The state notifiers 4.6A and 4.6B individually read the state memories 4.5A and 4.5B, transmit talk signals individually to the telephones 1A and 1B, and notify the present payer of the communication by lighting the lamps, displaying character symbols, or the like.

(3) When the telephone 1A is a pay telephone, the communication amount calculator 5.3A determines the charging rule (time, rate, and the like per charged unit of communication) from information (contents of communication service contract, accumulation of charged communication amount, and the like) related to the communicator A recorded in the memory 6A and the attributes (receiving location, communication distance, contents of communication service contract, and the like), successively reads the contents of the counter 5.1A, transmits a charging signal to the telephone 1A at every addition of charging rate to charge to the communicator A as the present payer.

(4) Change request reception (requesting method 1)

(4-1) Automatic change request by preregistration

When the changing time is reached during communication for automatic change request by preregistration (detected by time out of the timer 4.7A), the change request analyzer 4.2A analyzes the change request, the approval of (5) below is not executed, but instructs the operation instructor 4.4A to execute a change request R1 (here, specified in the contents of the preregistration) to carry out the following processing.

(4-2) The communicator A requests a change (requesting method 2)

During communication, when the communicator A presses down PB of the telephone 1A according to a predetermined number system to transmit a payer change request R2 (here, "the communicator B is the payer for communication after the request R2" is made) as a PB signal, the request signal receiver 4.1A receives the PB signal and sends the reception result to the change request analyzer 4.2A. The change request analyzer analyzes contents of the received request. Since consent of the communicator B is required for the change request R2, the change request analyzer 4.2A notifies the approval processor 4.3A of the request.

(5) Approval processing (5-1) The approval processor 4.3A notifies the payer change control device 3B at the communicator B side of the reception of the change request R2 from the communicator A, through the common channel signal interface 7A, the common channel signal network 8, and the common channel signal interface 7B, and further transmits to the approval processor 4.3B instructions of approval request and approval signal reception to the communicator B. At the same time, the approval processor 4.3A sets the timer 4.7A.

(5-2) To the state notifier 4.6B, the approval processor 4.3B provides an instruction to transmit the approval request signal of the communicator B to the change request R2 of the communicator A. The state notifier 4.6B transmits a talk signal to the telephone 1B to request an approval of the communicator B to the change request R2 by turning on and off the telephone's lamp, displaying an character symbol, or the like.

When, before the time out of the timer 4.7A, the communicator B presses down PB of the telephone 1B according to a predetermined number system to transmit an approval signal R2' as a PB signal to the change request R2, the change request analyzer 4.5A analyzes contents of the received signal and, if it is an approval signal, transfers it to the approval processor 4.3B.

(5-4) The approval processor 4.3B notifies the approval processor 4.3A at the communicator A side of the reception of the approval signal R2', through the common channel signal interface 7B, the common channel signal network 8, and the common channel signal interface VA. On receiving the reception notice of the approval signal R2', the approval processor 4.3A determines the change request R2 to have been approved, and instructs the operation instructor 4.4A to execute the change request R2.

(5-5) If the reception of the approval signal R2', is not notified before the time out of the timer 4.7A, the approval processor 4.3A determines the change request R2 to be disapproved and rejects it, and instructs the state notifier 4.6A to notify the communicator A of the fact. At the same time, the approval processor 4.3A notifies the payer change function unit 4B of the same fact.

(6) Change processing

Receiving the instruction to execute the change request R2 from the approval processor 4.3A, the operation instructor 4.4A stops the counter 5.1A, instructs the operation instructor 4.4B to begin charging to the communicator B through the common channel signal interface 7A, the common channel signal network 8, and the common channel signal interface 7B to begin communication time measurement by the counter 5.1B. As necessary, the operation instructor 4.4A instructs the exchange connection device 2A to temporarily hold the communication line for a time including a time interval for counter stop/start control, or connect to the announcement circuit.

The operation instructor 4.4A instructs the communication amount calculator 5.3A to transfer the present value of the counter 5.1A to the communication charge table X (FIG. 4(a)) to the communicator A in the memory 5.4A. In general, the communication amount (here, length of time) of the nth communication time segment where the communicator A in the communication is the payer is measured by the counter 5.1A and recorded on the nth row of the communication charge table X on the memory 5.4A. At the same time, the communication amount calculator 5.3A determines the charging rule (communication time and amount per charged communication unit) from information (contents of communication service contract, accumulation of charged communication amount, and the like) on the communicator A recorded on the memory 6A and the attributes (reception location, communication distance, contents of communication service contract, and the like) of the communicator B, and records the charging rule identifier to the communicator A in the communication time segment on the communication charge table X.

The communication charge table X is thus prepared. The communication charge table X, as shown in FIG. 4(a), shows that the communication times in the communication time segment numbers 1, 3, 5, 18 where the communicator A is the payer are 180 (sec), 511 (sec), 32 (sec), and 11 (sec), respectively, the charging rule identifiers (for example, unit price per unit rate) for the individual cases are (r-1), (r-1), (r-2), (r-3) and, in the communication time segment numbers 2, 4, and 6, the communicator A is not the payer.

The corresponding communication charge table Y, as shown in FIG. 4(b), shows that the communication times in the communication time segment numbers 2, 4, and 6 where the communicator B is the payer are 247 (sec), 13 (sec), 9 (sec), respectively, and the charging rule identifiers for the individual cases are (r-5), (r-7), and (r-7).

Further, the operation instructors 4.4A and 4.4B set that the communicator B is the present payer to the state memories 4.5A and 4.5B.

The state notifiers 4.6A and 4.6B read the state memories 4.5A and 4.5B, transmit talk signals to the telephones 1A and 1B, and notify the payer of that communication time segment by lighting the lamp of the telephone, displaying a character symbol, or the like.

(7) After completion of the change processing, the communication time after the change request R2 is measured by the counter 5.1B, and the communication is continued.

(8) The communicator A requests a change (requesting method 3)

During communication where the communicator B is the payer, when the communicator A presses down the PB of the telephone 1B to transmit a payer change request R3 (here, it is requested that the communicator A is the payer for communication after the acceptance of the request) as a PB signal, the request signal receiver 4.1A receives the PB signal, and transmits the received result to the change request analyzer 4.2A. The change request analyzer 4.2A analyzes the contents of the received request. In this case, since it is unnecessary to obtain a re-approval of the communicator A to be the payer after the change, the change request analyzer 4.2A instructs the operation instructor 4.4A to execute the change request R3.

(9) Change processing

Receiving the instruction to execute the change request R3, the operation instructor 4.4A instructs the operation instructor 4.4B to set the communicator A as the payer, through the common channel signal interface 7A, the common channel signal network 8, and the common channel signal interface 7B, once stops the counter 5.1B, and restarts communication time measurement by the counter 5.1A. As necessary, the operation instructor 4.4A instructs the exchange 2A to temporarily hold the communication line for a time including a time interval for counter stop/start control, or connect to the announcement circuit.

Further, the operation instructor 4.4B instructs the communication amount calculator 5.3B to transfer the present value of the counter 5.1B to the communication charge table Y (FIG. 4(b)) for the communicator B on the memory 5.4B. In general, the communication time of the nth communication time segment where the communicator A in the communication is the payer is measured by the counter 5.1B and recorded on the nth row of the communication charge table Y on the memory 5.4A. At the same time, the communication amount calculator 5.3B determines the charging rule (communication time and rate per charged communication unit) from information (contents of communication service contract, accumulation of charged communication amount, and the like) on the communicator B recorded in the memory 6B and the attributes (reception location, communication distance, contents of communication service contract, and the like) of the communicator A, and records the charging rule identifier to the communicator B in the communication time segment on the communication charge table Y. Construction of the communication charge table Y is as described above.

Further, the operation instructors 4.4A and 4.4B set the state memories 4.5A and 4.5B that the communicator A is the present payer. The state notifiers 4.6A and 4.6B individually read the state memories 4.5A and 4.5B to notify the telephones 1A and 1B of the present payer of the communication, by transmitting a talk signal, lighting the lamp of the telephone, displaying a character symbol, or the like.

(10) After completion of the present change processing, communication time after the change request R2 is measured by the counter 5.1A, and the communication is continued.

(11) Further, also when the change requests R1 to R3 are generated, the payer change control is made using the procedures described in (4) to (10) above to continue the communication.

(12) As a change request, when the communicator A transmits a change requests R4 that the kth communication time segment already ended to be charged to the communicator B is to be recharged to the communicator A, the request signal is received by the request signal receiver 4.1A, the change request analyzer 4.2A analyzes the request R4, and notifies the operation instructor 4.4A of the change.

The operation instructor 4.4A notifies the operation instructor 4.4B of the contents of the change request R4, through the common channel signal interface 7A, the common channel signal network 8, and the common channel signal interface 7B.

The operation instructor 4.4B instructs the communication amount calculator 5.3B to read a communication time Ty(k) recorded at the kth row of the communication charge table Y of the memory 5.4B and clears it. The operation instructor 4.4B notifies the operation instructor 4.4A of the value Ty(k). The operation instructor 4.4A instructs the communication amount calculator 5.3A to record the received value Ty(k) in the kth or an appropriate space area of the communication charge table X of the memory 5.4A.

This allows a payer change for an already ended communication time segment.

Further, as necessary, the communicator A is notified of the execution result of the change request R4. However, when acceptance of such a change request is difficult, such as when the telephone 1B is a pay telephone which immediately charges payment by coins or a card, this fact is notified by the state notifier 4.6A to the communicator B who made the request, and acceptance of the change request R4 is rejected.

(13) Communication fee calculation processing (13-1) When the communication is completed, the payer change control device 3A receives a communication end signal from the exchange 2A. As a result, the operation instructor 4.4A, in association with the communication end, stops the counter 5.1A, instructs the communication amount calculator 5.3A to transfer the contents of the counter 5.1A to the communication charge table X on the memory 5.4A. Further, the operation instructor 4.4A instructs the communication amount calculator 5.3A to execute calculation processing of the communication fee to be charged to the communicator A.

The communication amount calculator 5.3A calculates the communication fee to be charged to the communicator A for the present communication based on information of the communication rate table X, and records the result on the memory 6A.

(13-2) Similarly, the payer change control device 3B receives the communication end signal from the exchange connection device 2B, stops the counter 5.1B, transfers the contents of the counter 5.1B to the communication charge table Y on the memory 5.4B, calculates the communication fee to be charged to the communicator B for the present communication based on information of the communication charge table Y, and records the result on the memory 6B.

The above is an embodiment of charge calculation processing by the summation method 1, charge calculation processing by the summation method 2 is an embodiment in which the communication amount is measured using the counters 5.1 and 5.2 in combination.

For example, to achieve centralized measurement by the charge calculation unit 5A of the payer change control device 3A in a communication similar to the flow of (1) to (13) above, the length of time of the communication time segment where the communicator B is the payer by the counter 5.2A in place of measurement by the counter 5.1B is measured, and the measurement result is recorded in the communication charge table Y on the memory 5.5A. For this purpose, control over starting, stopping, restarting, and the like of measurement of the counter 5.2A and processing execution instruction to the communication amount calculator 5.3A are all executed by the operation instructor 4.4A.

Communication fee calculation immediately after completion of the communication is (a) executed concentratedly by the charge calculation unit 5A and recorded on the memory 6B. That is, in this case, the communication fee of the communicator B is also calculated by the charge calculation unit 5A according to a predetermined charging rule; or, (b) the payer change control device 3A notifies the payer change control device 3B of the contents of the communication charge table Y on the memory 5.5A, once transfers them to the communication charge table on the memory 5.5B, calculates the communication fee to be charged to the communicator B by the communication amount calculator 5.3B, and records it in the memory 6B. That is, in this case, only the communication amount of the communicator B is calculated by the charge calculation unit 5A and, applying a charging rule based on it, the communication fee is calculated by the charge calculation unit 5B.

Therefore, for (a), since the charging rule specific to the communicator B is applied to charge, the payer change control device 3A must recognize that charging rule.

Charging data for determining the charging rule to the communicator B in this case is utilized by various methods including (1) stored in the memory 6A from the beginning, (2) stored on the memory 6B and as necessary read to the memory 6A by the control of the operation instructor 4.4A, (3) the memories 6A and 6B are constructed by other memories for constructing a common data base, and the charging data in the memories is appropriately read, or the like. Therefore, the memory storing the charging data may be an existing one from the hardware point of view, may be contained in any part of the system, but is not limited to the construction of the memories 6A and 6B in the present embodiment.

Further, even for (b), it is of course possible to use the memories 6A and 6B constructed as a single data base.

When the memories 6A and 6B are individually provided corresponding to the payer change control devices 3A and 3B as in the present embodiment, the charging data can be flexibly changed.

Further, there is an embodiment in which acceptance of change request is concentrated to one of the payer change control devices 3A and 3B. That is, is a change request signal, an approval signal, and an automatic change request by previous registration are all transferred to the payer change control function device 4A of the payer change control device 3A, where the analysis, approval processing, and operation instruction are collectively executed.

For a communication service in which the communicator B is an information service provider and the tariff for the provided information is included in the communication fee to be charged, when the charging rate for unit information for the communication amount recorded on the communication charge tables X and Y is specified, the information service fee is calculated for every communication time segment applying the information amount charging rule by the charge calculation unit 5A or 5B, the charging amount to the designated payer is calculated, and the charging amount corresponding to the payer is recorded on the corresponding memory 6A or 6B.

When the payer is changed for the information, a service fee different from the usual communication fee, first a specific number in the number system by the change request PB signal so that the communicator can instruct the fact, and the number is translated by the change request analyzer 4.2.

The operation instructor 4.4 and the charge calculation unit 5 measure and calculate usual communication fee separately from the information service fee. For example, for jth communication time segment, when it is specified by the change request signal so that the communicator A is the payer for the information service fee, the operation instructor 4.4 controls the counters 5.1 and 5.2 to measure the communication amount to be charged to the communicators A and B, and instructs the communication amount calculator 5.3 to record the result on the communication charge tables X and Y. At this moment, that the corresponding information amount charging rule is applied to the value $Tx(j)$ in the communication charge table X, and that the corresponding charging rule is applied to the value $Ty(j)$ in the communication charge table Y are recorded in the column of charging rule identifier of the communication charge tables X and Y.

Thus, the charging amount is summed up based on the information of the communication charge tables X and Y at an appropriate point of time.

Embodiments have been described above assuming a typical line exchange network such as telephone network, the payer-variable exchange system of the present invention can also be applied to B-ISDN or packet communication network based on ATM technology if an amount to be the basis of charging in the communication time (for example, virtual connection continuation time, amount of information for every virtual connection, or the like) is measurable.

Further, for communication among multiple communicators such as meeting communication connecting three or more communicators, the payer can be changed applying the payer-variable exchange system according to the present invention. However, when a charging rule specific to the exchange network which the communicators A and B individually belong to is applied where a communicator C is the payer for communication between the communicators A and B, the charging amount to the communicator A or B is simply transferred to the communicator C. In this case, to calculate the charging amount in the payer change control device 3 connected to the exchange which the communicator C belongs to, the charging rules specific to the exchange networks which the communicators A and B belong to must be previously recognized by the device 3.

As describe above in detail with reference to the embodiments, the present invention provides the following effects:

(1) The communication fee can be correctly charged according to the charging rule to the payer for a communication called as a receiver-charged service as ordinary automatic dial telephone communication, without disconnecting and re-calling the communication and, as necessary, changing to communication to a caller-charged communication, and without holding both charging rules for the caller and receiver.

(2) Also for a communication called as a receiver-charged service, the communication fee can be correctly charged according to the charging rule to the payer without disconnecting and re-calling and, as necessary, changing to communication to a caller-charged communication.

(3) The payer can be changed and the communication fee can be correctly recharged according to the charging rule to the payer after the change for part or all of communication where the time is passed as a caller-charged or receiver-charged communication. Further, the communication fee can be transferred to the payer after the change while the communication fee before the change is maintained for the communication by an approval of the payer after the change.

(4) It is also possible to process only the communication fee to be charged to the communicator at own side individually at the caller side and the receiver side, or collectively at one side. (5) Communication can be continued by changing the payer during communication by caller-charged communication from a coin or card type pay telephone even if coins are exhausted in the course of communication.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A payer-variable exchange system wherein a caller and a receiver are connected by a communication line through an exchange according to a receiver select number instructed by the caller from a communication terminal and a communication fee is charged to the caller or the receiver according to tariffs common or specific to the caller and the receiver, said system comprising:

payer change function units and charge calculation units provided individually at a caller side and a receiver side;

wherein each of said payer change function units analyzes contents of a payer change request to transmit and receive signals from the other of said payer change function units and controls said system so that a communication amount is counted by a communication fee calculator of a communicator instructed to be the payer;

wherein each of said charge calculation units includes count means for counting the communication amount where itself is the payer, calculates the communication fee using a charging rule common or specific to a count value, and stores the communication fees in individual memories;

said payer-variable exchange system having payer change function units and charge calculation units individually at the caller side and the receiver side and having a data base previously registered with contents of a timing of payer change and information of a communication terminal, whereby payer change control is performed based on the change request registered in the data base read prior to communication.

2. A payer-variable exchange system wherein a caller and a receiver are connected by a communication line through an exchange according to a receiver select number instructed by the caller from a communication terminal and a communication fee is charged to the caller or the receiver according to tariffs common or specific to the caller and the receiver, said system comprising:

payer change function units and charge calculation units provided individually at a caller side and a receiver side;

wherein each of said payer change function units analyzes contents of a payer change request to transmit and receive signals from the other of said payer change function units and controls said system so that a communication amount is counted by a communication fee calculator of a communicator instructed to be the payer;

wherein each of said charge calculation units includes count means for counting the communication amount where itself is the payer, calculates the communication fee using a charging rule common or specific to a count value, and stores the communication fees in individual memories;

said payer-variable exchange system having a payer change function unit for processing so that when a payer change request signal is processed and it is detected that the change request is not a request of one who is to be a new payer, a presence of the change request is notified to a communication terminal of the other party through said payer change function unit of the other party, and the payer is changed after receiving a signal representing an approval of the other party on the payer change.

3. A payer-variable exchange system wherein a caller and a receiver are connected by a communication line through an exchange according to a receiver select number instructed by the caller from a communication terminal and a communication fee is charged to the caller or the receiver according to tariffs common or specific to the caller and the receiver, said system comprising:

payer change function units and charge calculation units provided individually at a caller side and a receiver side;

wherein each of said payer change function units analyzes contents of a payer change request to transmit and receive signals from the other of said payer change function units and controls said system so that a communication amount is counted by a communication fee calculator of a communicator instructed to be the payer;

wherein each of said charge calculation units includes count means for counting the communication amount where itself is the payer, calculates the communication fee using a charging rule common or specific to a count value, and stores the communication fees in individual memories;

said payer-variable exchange system having a payer change function unit for controlling so that when a payer change request is processed and it is detected that the change request is a request to make itself as a new payer, the presence of the change request is notified to said payer change function unit of the other party, and the corresponding charge calculation unit counts the communication amount.

4. The payer-variable exchange system as claimed in claim 1, further comprising:

a tariff calculator wherein when one of the communication terminals is a chargeable communication terminal such as a public pay telephone, and the communication terminal side is the payer, a charging pulse is transmitted every time the charging rate is accumulated and, when the communication terminal side is not the payer, transmission of the charging pulse is stopped.

5. A payer-variable exchange system wherein a caller and a receiver are connected by a communication line through an exchange according to a receiver select number instructed by the caller from a communication terminal and a communication fee is charged to the caller or the receiver according to tariffs common or specific to the caller and the receiver, said system comprising:

payer change function units and charge calculation units provided individually at a caller side and a receiver side;

wherein each of said payer change function units analyzes contents of a payer change request to transit and receive signals from the other of said payer change function units, and controls said system so that communication amounts of both the caller side and the receiver side are collectively counted by communication fee calculators, information on the communication fee of a partner is transferred to the partner after completion of the communication, and the information is stored in a partner memory through the corresponding payer change function unit and communication fee calculator;

wherein each of said charge calculation units includes first count means for counting the communication amount where itself is the payer and second count means for counting the communication amount where the other party is the payer, whereby charging rules common or specific to each of said first or second count means are referred to calculate communication fees, information on its own communication fee is stored in a memory and information on the partner's communication fee is transferred;

said pay-variable exchange system having payer change function units and charge calculation units individually at the caller side and the receiver side and having a data base previously registered with contents of a timing of payer change and information of a communication terminal, whereby payer change control is performed based on the change request registered in the data base read prior to communication.

6. A payer-variable exchange system wherein a caller and a receiver are connected by a communication line through an exchange according to a receiver select number instructed by the caller from a communication terminal and a communication fee of the communication is charged to the caller or the receiver according to tariffs common or specific to the caller and the receiver, said system comprising:

payer change function units and charge calculation units provided individually at a caller side and a receiver side;

wherein each of said payer change function units analyzes contents of a payer change request to transmit and receive signals from the other of said payer change function units, and controls said system so that one of said charge calculation units collectively counts communication amounts of both the caller side and the receiver side, information on the communication amount of the other party is transferred to the other party after completion of the communication, and the information is stored in a memory of the other party through the corresponding one of said payer change function units and said charge calculation unit of the other party;

wherein each of said charge calculation units includes first count means for counting the communication amount where itself is the payer and second count means for counting the communication amount where the other party is the payer, whereby the count value of said first count means and charging rules common or specific to itself are utilized to calculate communication fees to be stored in a memory, the communication fee is calculated based on the count value of said second count means where the other party is the payer, and information on the communication amount is transferred;

said pay-variable exchange system having payer change function units and charge calculation units individually at the caller side and the receiver side and having a data base previously registered with contents of a timing of payer change and information of a communication terminal, whereby payer change control is performed based on the change request registered in the data base read prior to communication.

7. A payer-variable exchange system wherein a caller and a receiver are connected by a communication line through an exchange according to a receiver select number instructed by the caller from a communication terminal and a communication fee is charged to the caller or the receiver according to tariffs common or specific to the caller and the receiver, said system comprising:

payer change function units and charge calculation units provided individually at a caller side and a receiver side;

wherein each of said payer change function units analyzes contents of a payer change request to transit and receive signals from the other of said payer change function units, and controls said system so that communication amounts of both the caller side and the receiver side are collectively counted by communication fee calculators, information on the communication fee of a partner is transferred to the partner after completion of the communication, and the information is stored in a partner memory through the corresponding payer change function unit and communication fee calculator;

wherein each of said charge calculation units includes first count means for counting the communication amount where itself is the payer and second count means for counting the communication amount where the other party is the payer, whereby charging rules common or specific to each of said first or second count means are referred to calculate communication fees, information on its own communication fee is stored in a memory and information on the partner's communication fee is transferred;

said pay-variable exchange system having a payer change function unit for processing so that when a payer change request signal is processed and it is detected that the change request is not a request of one who is to be a new payer, a presence of the change request is notified to a communication terminal of the other party through said payer change function unit of the other party, and the payer is changed after receiving a signal representing an approval of the other party of the payer change.

8. A payer-variable exchange system wherein a caller and a receiver are connected by a communication line through an exchange according to a receiver select number instructed by the caller from a communication terminal and a communication fee of the communication is charged to the caller or the receiver according to tariffs common or specific to the caller and the receiver, said system comprising:

payer change function units and charge calculation units provided individually at a caller side and a receiver side;

wherein each of said payer change function units analyzes contents of a payer change request to transmit and receive signals from the other of said payer change function units, and controls said system so that one of said charge calculation units collectively counts communication amounts of both the caller side and the receiver side, information on the communication amount of the other party is transferred to the other party after completion of the communication, and the information is stored in a memory of the other party through the corresponding one of said payer change function units and said charge calculation unit of the other party;

wherein each of said charge calculation units includes first count means for counting the communication amount where itself is the payer and second count means for counting the communication amount where the other party is the payer, whereby the count value of said first count means and charging rules common or specific to itself are utilized to calculate communication fees to be stored in a memory, the communication fee is calculated based on the count value of said second count means where the other party is the payer, and information on the communication amount is transferred;

said pay-variable exchange system having a payer change function unit for processing so that when a payer change request signal is processed and it is detected that the change request is not a request of one who is to be a new payer, a presence of the change request is notified to a communication terminal of the other party through said payer change function unit of the other party, and the payer is changed after receiving a signal representing an approval of the other party of the payer change.

9. A payer-variable exchange system wherein a caller and a receiver are connected by a communication line through an exchange according to a receiver select number instructed by the caller from a communication terminal and a communication fee is charged to the caller or the receiver according to tariffs common or specific to the caller and the receiver, said system comprising:

payer change function units and charge calculation units provided individually at a caller side and a receiver side;

wherein each of said payer change function units analyzes contents of a payer change request to transit and receive signals from the other of said payer change function units, and controls said system so that communication amounts of both the caller side and the receiver side are collectively counted by communication fee calculators, information on the communication fee of a partner is transferred to the partner after completion of the communication, and the information is stored in a partner memory through the corresponding payer change function unit and communication fee calculator;

wherein each of said charge calculation units includes first count means for counting the communication amount where itself is the payer and second count means for counting the communication amount where the other party is the payer, whereby charging rules common or specific to each of said first or second count means are referred to calculate communication fees, information on its own communication fee is stored in a memory and information on the partner's communication fee is transferred;

said pay-variable exchange system having a payer change function unit for controlling so that when a payer change request is processed and it is detected that the change request is a request to make itself as a new payer, the presence of the change request is notified to said payer change function unit of the other party, and the corresponding charge calculation unit counts the communication amount.

10. A payer-variable exchange system wherein a caller and a receiver are connected by a communication line through an exchange according to a receiver select number instructed by the caller from a communication terminal and a communication fee of the communication is charged to the caller or the receiver according to tariffs common or specific to the caller and the receiver, said system comprising:

payer change function units and charge calculation units provided individually at a caller side and a receiver side;

wherein each of said payer change function units analyzes contents of a payer change request to transmit and receive signals from the other of said payer change function units, and controls said system so that one of said charge calculation units collectively counts communication amounts of both the caller side and the receiver side, information on the communication amount of the other party is transferred to the other party after completion of the communication, and the information is stored in a memory of the other party through the corresponding one of said payer change function units and said charge calculation unit of the other party;

wherein each of said charge calculation units includes first count means for counting the communication amount where itself is the payer and second count means for counting the communication amount where the other party is the payer, whereby the count value of said first count means and charging rules common or specific to itself are utilized to calculate communication fees to be stored in a memory, the communication fee is calculated based on the count value of said second count means where the other party is the payer, and information on the communication amount is transferred;

said pay-variable exchange system having a payer change function unit for controlling so that when a payer change request is processed and it is detected that the change request is a request to make itself as a new payer, the presence of the change request is notified to said payer change function unit of the other party, and the corresponding charge calculation unit counts the communication amount.

11. The payer-variable exchange system as claimed in claim 2, further comprising: a tariff calculator wherein one of the communication terminals is a chargeable communication terminal such as a public pay telephone, and the communication terminal side is the payer, a charging pulse is transmitted every time the charging rate is accumulated and, when the communication terminal side is not the payer, transmission of the charging pulse is stopped.

\* \* \* \* \*